Patented Nov. 14, 1939

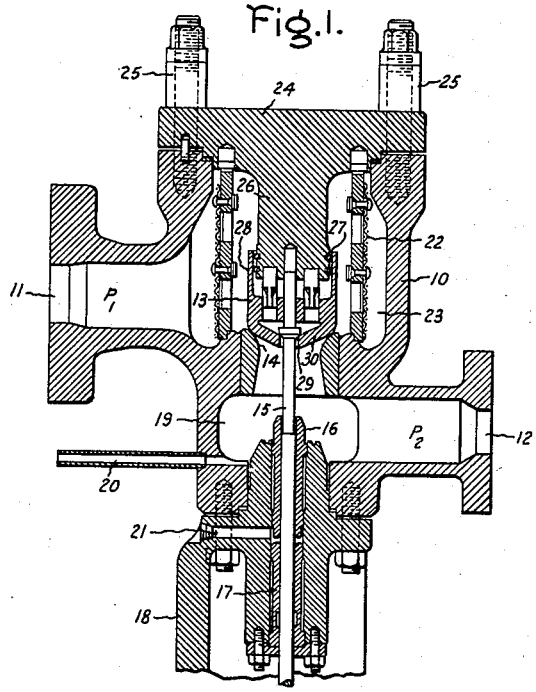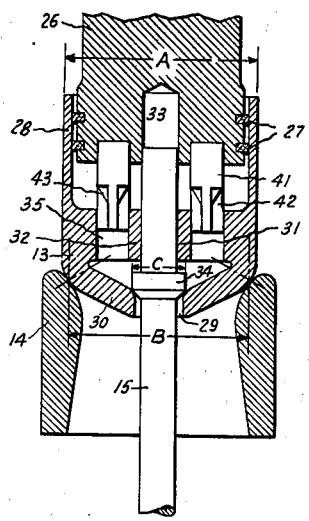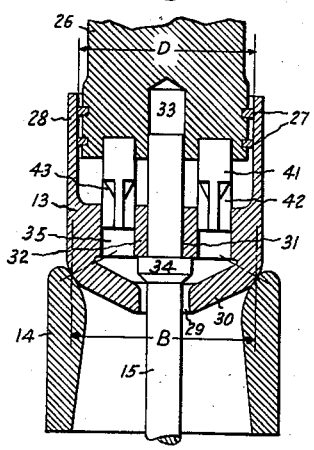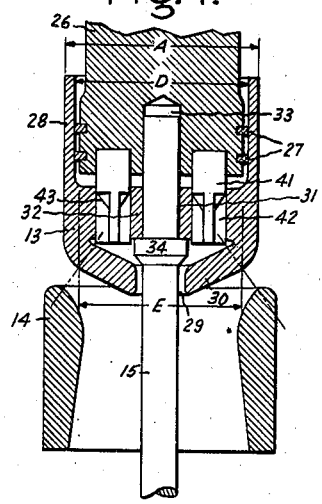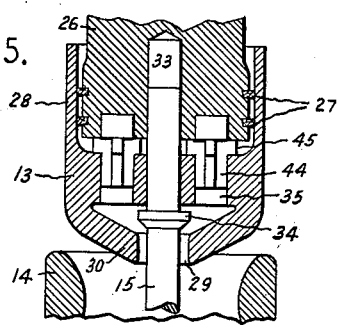
Inventor:
John Ashworth,
by Harry E. Dunham
His Attorney.

2,180,188

UNITED STATES PATENT OFFICE 2,180,188

VALVE

John Ashworth, Schenectady, N. Y., assignor to General Electric Company, a corporation of New York Application August 31, 1938, Serial No. 227,743

13 Claims. (Cl. 277—37)

This invention relates to valves and more particularly to valves of the so-called balanced or semi-balanced types. Although not necessarily limited thereto, the arrangement is particularly adaptable to valves having convexly curved seats and disks for use in high pressure elastic fluid conduit systems.

Generally, valves used in steam conduit systems and the like are provided with auxiliary pilot valves for facilitating the opening thereof against relatively high pressures. Upon the opening of the pilot valve, the major portion of the valve disk area is unloaded leaving the valve disk only very slightly loaded or unbalanced in the closed direction. The valve disk may then be opened readily by the operating mechanism with a relatively small motor or manually.

In valves having convexly curved seats and disks, such as Venturi and ball type valves, the diameter of the throttling orifice varies in accordance with the valve opening, changing the balanced condition thereof. Thus, a valve of this type designed for relatively low power opening is frequently unstable in the opened position and the disk is likely to vibrate excessively or hammer upon the operating stem.

It is an object of this invention to provide a new and improved valve for use in high pressure systems which is relatively easy to operate, the valve disk of which is maintained in a stabilized condition throughout its various positions of adjustment.

It is a further object of this invention to provide a new and improved high pressure valve having means for impressing a compensating load upon the valve disk as it is moved to the opened position so as to preclude the unloading or the reversal of the loading thereof.

For a consideration of what I believe to be novel and my invention, attention is directed to the following description and the claims appended thereto taken in connection with the accompanying drawing.

In the drawing, Fig. 1 is a cross-sectional view of a valve embodying my invention; Figs. 2, 3 and 4 are fragmentary cross-sectional views showing the valve disk in various positions of adjustment with respect to the cooperating seat; and Fig. 5 is a fragmentary cross-sectional view of a valve illustrating a modification of the invention.

Referring to Fig. 1 of the drawing, 10 is the valve casing having an inlet 11 and an outlet 12. Arranged within the valve casing is a valve disk 13 and a cooperating seat 14. The surfaces of the disk and seat are of a low loss convexly curved configuration shown in this instance as being of the well-known Venturi design. The valve disk is adapted to be operated by means of a stem 15 slidably arranged in bushings 16 and 17 and extending to a suitable operating motor (not shown) mounted within the lower casing part 18. The lower valve chamber 19 is provided with a usual water drain connection 20 and a steam leak-off passage 21. A cylindrical screen 22 is provided within the upper valve chamber 23 to protect the cooperating valve parts from any foreign matter which might find its way into the system. The cover plate 24 secured onto the casing as by bolts 25 is provided with a cylindrical portion or valve head 26 depending downwardly therefrom and in alignment with the cooperating valve parts 13 and 14. The lower portion of the valve head 26 is provided with a plurality of packing rings 27 for engaging with the inner walls of the balancing cylinder 28 extending upwardly from the periphery of the valve disk 13. The operating stem 15 extends upwardly through the opening 29 in the apex of the valve disk cone 30, through the bearing 31 in the valve disk frame portion 32, the upper end of the operating stem being slidably arranged within the bore 33 centrally disposed in the lower end of the valve head 26. The auxiliary pilot valve 34, fixed on the operating stem, is adapted to seat upon and close the opening 29 in accordance with the position of adjustment of the stem. Openings 35 are provided through the valve disk frame portion 32 allowing communication between the balancing cylinder and the opening 29.

The valve arrangement thus far described is of a form well-known in the art, the operation of which will be described as follows: Referring to Fig. 2, the valve is shown in its closed position with the disk 13 resting upon the seat 14 and with the auxiliary pilot valve 34 closing the opening 29. Assume that a pressure $P_1$ exists on the inlet side of the valve which, for example, may be of the order of 1200 pounds per square inch and that a pressure $P_2$ exists on the outlet side of the valve which during the closed position thereof will be substantially zero. The pressure $P_1$ acts upon the valve disk to force it downwardly throughout the area of the disk indicated by the diameter A. It is understood, of course, that while the packing rings 27 between the balancing cylinder 28 and the valve head 26 are closely fitted, a certain amount of steam leakage therepast will occur during the closed position of the valve so that the pressure in the balancing cylinder will become substantially equal to the pressure $P_1$. Leakage of steam will also occur past the upper end of the operating stem 15 and into the bore 33 so that the entire upper surface of the valve disk represented by its outer diameter A will be subjected to the downward force of the pressure $P_1$. Because of the curved surfaces of the lower portion of the valve disk 13 and the cooperating valve seat 14, the diameter of contact B is somewhat smaller than the outside diameter A of the valve disk. The effective area, then, subjected to the closing pressure of the steam is that indicated by the diameter B because the steam pressure acting upon the curved lower edge of the disk outside the circumference of contact exerts a force in opposition to that acting downwardly on the disk. To open the valve, the stem 15 is first moved upwardly to some position as indicated in Fig. 3. The pilot valve may be readily opened by a relatively small force, since it is held closed by the steam pressure $P_1$ acting only upon its area indicated by C. With the pilot valve 34 moved from its cooperating seat the pressure within the balancing cylinder will leak off through the outlet 29. The leakage of steam past the packing rings 27 will be so slight as to be ineffective in building up any appreciable pressure within the balancing cylinder because of the relatively large opening 29. The area of the balancing cylinder indicated by the diameter D will thus be unloaded while the valve disk will be loaded in the closed direction by the pressure $P_1$ acting only upon the differential area B—D. This area may be made as small as desired by making the inner diameter of the balancing cylinder just slightly smaller than the diameter of contact B of the valve disk. With the valve disk thus being held in the closed position by a relatively small force, it may be readily lifted to the opened position shown in Fig. 4 with a relatively small effort applied to the operating stem 15. As the stem 15 is moved upwardly, the upper surface of the auxliary pilot valve 34 engages with the valve disk frame collar 34 to carry the disk to the desired opened position.

With reference to Fig. 4, it will be noted that, as the valve disk is moved upwardly, due to the curved valve surfaces, the throttling orifice diminishes in diameter as regards the valve disk. By throttling orifice is meant the point of narrowest separation between the seat and the disk. When the valve disk is first moved from the seat, the throttling orifice, as regards the disk, has a diameter substantially equal to B but as the valve is moved to a wider opened position, the throttling orifice is decreased to a smaller diameter as indicated at E in Fig. 4, which diameter in the fully opened position of the valve is smaller than the diameter D of the balancing cylinder. In the position shown the differential area A—E is larger than the differential area A—D and the valve disk is unbalanced in the upward direction by the resultant force of the pressure $P_1$ acting upon the differential area D—E. This resultant force acting upwardly on the disk tends to close the opening 29 by moving the disk into engagement with the valve 34. The interior of the valve including the balancing cylinder will close off as regards the pressure $P_2$ and the pressure will build up within the interior of the valve due to leakage past the packing rings 27 until it approaches the pressure $P_1$. Upon some predetermined pressure building up within the balancing cylinder, the disk will be moved downwardly to reopen the auxiliary pilot valve. As soon as the pressure decreases within the valve disk below a predetermined value, the disk will again be moved upwardly and so on, causing the valve disk to oscillate or hammer at some frequency depending upon the various mechanical constants.

Such instability of the valve disk during the opened position may be avoided, of course, by so designing the valve that the throttling orifice will never decrease to a value less than the internal diameter of the balancing cylinder. This, however, cannot be done without leaving a rather large area of the valve disk loaded with the pressure $P_1$ after the pilot valve is opened. The instability of the valve in the opened position, as described, is inherent if the valve is closely balanced for relatively easy opening.

According to my invention, I provide a plurality of pins 41 fixedly secured in the lower surface of the valve head 26. These pins are so aligned with respect to the holes or openings 35 and are of such size as to substantially close the openings when the valve disk is moved to a predetermined opened position. The pins 41 are fluted at the lower ends thereof, as indicated at 42, for maintaining the disk in a predetermined centered position while allowing free communication between the balancing cylinder and the opening 29 when the auxiliary pilot valve is initially opened. As shown in Fig. 4, when the valve disk is moved to the opened position, the solid upper portion of the pins 41 projects into the openings 30 so as to substantially shut off communication between the balancing cylinder and the opening 29. By this arrangement, it will be seen that the pressure leaking past the packing rings 27 will build up within the balancing cylinder to unbalance the disk in the downward direction. The area thus subjected to the pressure $P_1$ acting downwardly upon the valve is considerably in excess of the pressure acting upwardly upon the valve disk so the disk is unbalanced in the downward direction. Accordingly, the closing of the pilot valve during the opened positions of the valve disk is precluded due to the unbalance of pressure acting thereon in the downward direction. By suitably adjusting the clearance between the pins 41 and the openings 35 so that a certain leakage therepast may be had, the resultant downward force can be regulated as desired. By suitably tapering the shoulders 43 of the pins, the effectiveness thereof may be graduated in accordance with the shifting of the throttling orifice during the opening movements of the valve disk.

By the arrangement described, the valve disk is stable in all positions of adjustment since it is continuously biased downwardly. In all opened positions the disk frame portion 32 is maintained seated upon the shoulder of the valve collar 34. Vibration or hammering of the disk upon the stem is precluded while the pins 41 projecting into the openings 35 further preclude spinning of the disk upon the stem which also occurs with harmful results in valves according to the previous practice.

If the valve is to be used for throttling purposes, it is required that the valve disk be biased downwardly, as by the arrangement described above, in order that it will follow the movements of the stem 15 in the various positions of adjustment. If, however, the valve is to be used as a two position stop valve in a system of substantially constant fluid flow, it is not necessary that the disk ride upon the stem 15 during the opened condition of the valve. The upward unbalance of pressure acting on the disk caused by the decrease in the diameter E of the throttling orifice may be utilized for retaining the disk in the full open position. According to Fig. 5, the pins 44 are fluted for substantially their full exposed length and provided with shoulders 45 which act as stops for the disk holding it in such a position that the auxiliary pilot valve will not seat. The fluid leaking past the packing rings 27 will drain through the openings 35 and the opening 29 and the disk will be retained in the uppermost position by the pressure P₁ acting upon the area D—E.

Having described the principle of operation of my invention together with the apparatus which I now consider to represent the best embodiment thereof, I desire to have it understood that the apparatus shown is only illustrative and that the invention may be carried out by other means.

What I claim as new and desire to secure by Letters Patent of the United States, is:

1. In a valve having a seat, and a balancing cylinder, a disk, the throttling orifice of which decreases progressively in diameter with respect to the diameter of said disk from a value greater than the diameter of said balancing cylinder to a value less than the diameter of said balancing cylinder as the valve disk is moved to the opened position, the combination comprising means for causing the unloading of a portion of the upper area of said disk preparatory to moving said disk to the open position, and means for subsequently effecting the loading of a portion of the upper area of said disk as said disk is moved to a predetermined opened position.

2. In a valve having a convexly curved seat, a convexly curved cooperating disk, and a balancing cylinder, the throttling orifice between said seat and said disk decreasing progressively in diameter from a value greater than the diameter of said balancing cylinder to a value less than the diameter of said balancing cylinder as said disk is moved to the opened position, the combination comprising means for effecting the unloading of a portion of the upper area of said disk preparatory to opening of said valve, and means effecting progressively an increase of the loading of said disk, as it is moved to the wide opened position.

3. A valve comprising a casing part having a convexly curved valve seat therein, a convexly curved disk part, a balancing cylinder extending from one of said parts and a head secured to the other part for extending into said cylinder, a pilot valve in said disk part for unloading said cylinder, openings in said disk part between said cylinder and said pilot valve, valve means secured to said casing part for controlling said openings in accordance with a predetermined opened position of said disk part.

4. A valve comprising a casing part having a convexly curved valve seat therein, a convexly curved valve disk part, an operating stem for said disk part, a cylinder extending from one of said parts toward the other of said parts, a head secured to the other of said parts and cooperatively extending into said cylinder, a pilot valve in said disk part and operable by said stem for unloading said cylinder, openings in said disk part between said cylinder and said pilot valve, valve means secured to said casing part for substantially closing said openings in a predetermined opened position of said valve disk part.

5. In a valve having a seat and a cooperating disk, the contacting surfaces thereof being convexly curved, the combination comprising means for operating said disk, means including a pilot valve and a balancing cylinder associated with said disk for effecting the unloading of a portion of said disk, said balancing cylinder having a diameter less than the seating diameter of said disk and greater than the diameter of the throttling orifice of said valve in the fully opened position whereby said disk will be forced to its uppermost position of travel with respect to said seat by the fluid flowing therethrough after it has been mechanically moved to a predetermined open postion, and means for precluding the closure of said pilot valve during a predetermined opened position of said disk.

6. In a valve having a casing, a convexly curved valve seat and a convexly curved cooperating disk, the combination comprising a cooperating balancing cylinder and a head slidably arranged within said cylinder, said cylinder and said head arranged between said disk and said casing, the inner diameter of said cylinder being less than the seating diameter of said disk and greater than the diameter of the throttling area of said disk in the opened position of said valve, a pilot valve associated with said disk for effecting the unloading of said balancing cylinder preparatory to opening said valve, and means for precluding the closure of said pilot valve upon said valve disk being moved to the opened position.

7. A valve having a casing, a valve seat in said casing, a valve disk, the contacting surfaces of said seat and disk being convexly curved, an operating stem for said disk, said disk having a balancing cylinder extending from the upper portion thereof, a valve head secured to said casing and depending downwardly into said cylinder, a pilot valve associated with said stem for unloading said cylinder, openings in said disk between said cylinder and the pilot valve, valve means depending from said valve head and aligned with said openings for substantially closing said openings in a predetermined opened position of said valve disk.

8. A valve comprising a casing, a valve seat in said casing, a valve disk for cooperating with said seat, the contacting surfaces of said seat and disk being convexly curved, operating means for said disk, said disk having a cylinder extending upwardly therefrom, a valve head secured to said casing and depending downwardly into and in close cooperation with said cylinder, a pilot valve in said disk for unloading said cylinder, openings in said disk between said cylinder and said pilot valve, valve means for substantially closing said openings in a predetermined opened position of said valve disk.

9. In a Venturi type valve, a casing, a valve seat in said casing, a valve disk for cooperating with said seat, an operating stem for said disk, said disk having a balancing cylinder extending from the upper surface thereof, a head secured to said casing and extending downwardly into said cylinder, a pilot valve operatively associated with said stem in said valve disk for unloading said cylinder, openings in said disk between said cylinder and said pilot valve, pins depending from said valve head and projecting into said openings for substantially closing said openings in a predetermined opened position of said valve disk.

10. A Venturi type valve comprising a casing, a valve seat in said casing, a valve disk for cooperating with said seat, an operating stem for said disk, a balancing cylinder extending upwardly from said disk, a valve head secured to said casing and depending downwardly into and in close cooperation with said cylinder, a pilot valve in said disk for unloading said cylinder, openings in said disk between said cylinder and said pilot valve, means for substantially closing said openings in a predetermined opened position of said disk.

11. In a valve having a seat and a cooperating disk, the contacting surfaces thereof being convexly curved, the combination comprising means for operating said disk, means including a pilot valve and a balancing cylinder associated with said disk for effecting the unloading of a portion of said disk, said balancing cylinder having a diameter less than the seating diameter of said disk and greater than the diameter of the throttling orifice in the fully opened position of said valve, and means for cooperating with said disk upon a predetermined opening movement thereof to preclude the closure of said pilot valve by the force of the fluid flowing through said valve.

12. A valve comprising a casing part having a convexly curved valve seat therein, a convexly curved valve disk part for cooperating with said seat, an operating stem for said disk part, a cylinder extending from one of said parts toward the other of said parts, a head secured to the other of said parts and cooperatively extending into said cylinder, a pilot valve in said disk part and operable by said stem for unloading said cylinder, openings in said disk part between said cylinder and said pilot valve, and means arranged in said openings providing a stop for limiting the opening movement of said valve disk to preclude the closure of said pilot valve upon a predetermined valve opening movement of said operating stem.

13. A valve having a casing, a valve seat in said casing, a valve disk, the contacting surfaces of said seat and disk being convexly curved, an operating stem for said disk, said disk having a balancing cylinder extending from the upper portion thereof, said balancing cylinder having a diameter less than the seating diameter of said disk and greater than the throttling orifice of said valve in the fully opened position, a head fixed with respect to said casing and depending into said cylinder, a pilot valve in said disk operable by said stem for unloading said cylinder, an opening in said disk between said cylinder and said pilot valve, and stop means for limiting the opening movement of said valve disk for precluding closure of said pilot valve upon a predetermined opening movement of said operating stem.

JOHN ASHWORTH.

CERTIFICATE OF CORRECTION.

Patent No. 2,180,188.　　　　　　　　　　　　　　November 14, 1939.

JOHN ASHWORTH.

It is hereby certified that error appears in the printed specification of the above numbered patent requiring correction as follows: Page 2, first column, line 43, for "auxliary" read auxiliary; page 3, first column, line 21, claim 1, strike out the words and comma "a disk," and insert the same before "and", line 20, same claim; and that the said Letters Patent should be read with this correction therein that the same may conform to the record of the case in the Patent Office.

Signed and sealed this 2nd day of January, A. D. 1940.

(Seal)　　　　　　　　　　　　　　　　　　　　Henry Van Arsdale,
　　　　　　　　　　　　　　　　　　　　Acting Commissioner of Patents.